(12) United States Patent
Tang et al.

(10) Patent No.: US 10,812,304 B2
(45) Date of Patent: Oct. 20, 2020

(54) METHOD FOR TRANSMITTING SIGNAL, NETWORK DEVICE AND TERMINAL DEVICE

(71) Applicant: GUANGDONG OPPO MOBILE TELECOMMUNICATIONS CORP., LTD., Dongguan, Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/353,818

(22) Filed: Mar. 14, 2019

(65) Prior Publication Data
US 2019/0215209 A1    Jul. 11, 2019

Related U.S. Application Data

(63) Continuation of application No. PCT/CN2016/110750, filed on Dec. 19, 2016.

(51) Int. Cl.
*H04W 4/00* (2018.01)
*H04L 27/26* (2006.01)
(Continued)

(52) U.S. Cl.
CPC ....... *H04L 27/2613* (2013.01); *H04B 7/0617* (2013.01); *H04L 1/06* (2013.01);
(Continued)

(58) Field of Classification Search
None
See application file for complete search history.

(56) References Cited

U.S. PATENT DOCUMENTS

2015/0163782 A1*  6/2015  Ji .................. H04L 5/0048
                                              370/329
2016/0057784 A1*  2/2016  You ............... H04W 88/04
                                              370/329
(Continued)

FOREIGN PATENT DOCUMENTS

CN    101594335 A    12/2009
CN    102118340 A     7/2011
(Continued)

OTHER PUBLICATIONS

International Search Report (ISR) and Written Opinion (WO) dated Sep. 26, 2017 for Application No. PCT/CN2016/110750.
(Continued)

*Primary Examiner* — Clemence S Han
(74) *Attorney, Agent, or Firm* — Ladas & Parry LLP

(57) ABSTRACT

The present application discloses a method for transmitting a signal, a network device and a terminal device. The method includes: determining a time-frequency resource for a reference signal required by a control channel, where the time-frequency resource for the reference signal includes multiple sets of resource groups, and the resource group includes two resource elements (RE) that are consecutive in a frequency domain; transmitting the reference signal via the time-frequency resource for the reference signal. The method for transmitting a signal, the network device and the terminal device according to embodiments of the present application can improve the performance of the system.

15 Claims, 11 Drawing Sheets

(51) Int. Cl.
    *H04L 5/00*           (2006.01)
    *H04L 1/06*           (2006.01)
    *H04B 7/06*          (2006.01)

(52) U.S. Cl.
    CPC .......... *H04L 5/0007* (2013.01); *H04L 5/0039* (2013.01); *H04L 5/0048* (2013.01); *H04L 5/0053* (2013.01); *H04L 5/0083* (2013.01); *H04L 5/0094* (2013.01); *H04L 27/26* (2013.01)

(56) References Cited

U.S. PATENT DOCUMENTS

| | | | |
|---|---|---|---|
| 2016/0249334 A1* | 8/2016 | Feng | H04L 5/0053 |
| 2018/0083676 A1* | 3/2018 | Wei | H04L 5/0048 |
| 2020/0053789 A1* | 2/2020 | Lee | H04L 5/00 |

FOREIGN PATENT DOCUMENTS

| | | |
|---|---|---|
| CN | 102711253 A | 10/2012 |
| CN | 103312464 A | 9/2013 |
| CN | 103685118 A | 3/2014 |
| WO | 2014/134966 A1 | 9/2014 |

OTHER PUBLICATIONS

English translation of CN 103685118 A.
English translation of CN 103312464 A.
espacenet English abstract of CN 102711253 A.
espacenet English abstract of CN 102118340 A.
espacenet English abstract of CN 101594335 A.
English abstract of WO 2014/134966 A1.
Supplementary European Search Report dated Jun. 25, 2019 for Application No. EP 16924488.6.
The First Action of corresponding Chinese application No. 201680088656.0, dated May 22, 2020.

* cited by examiner

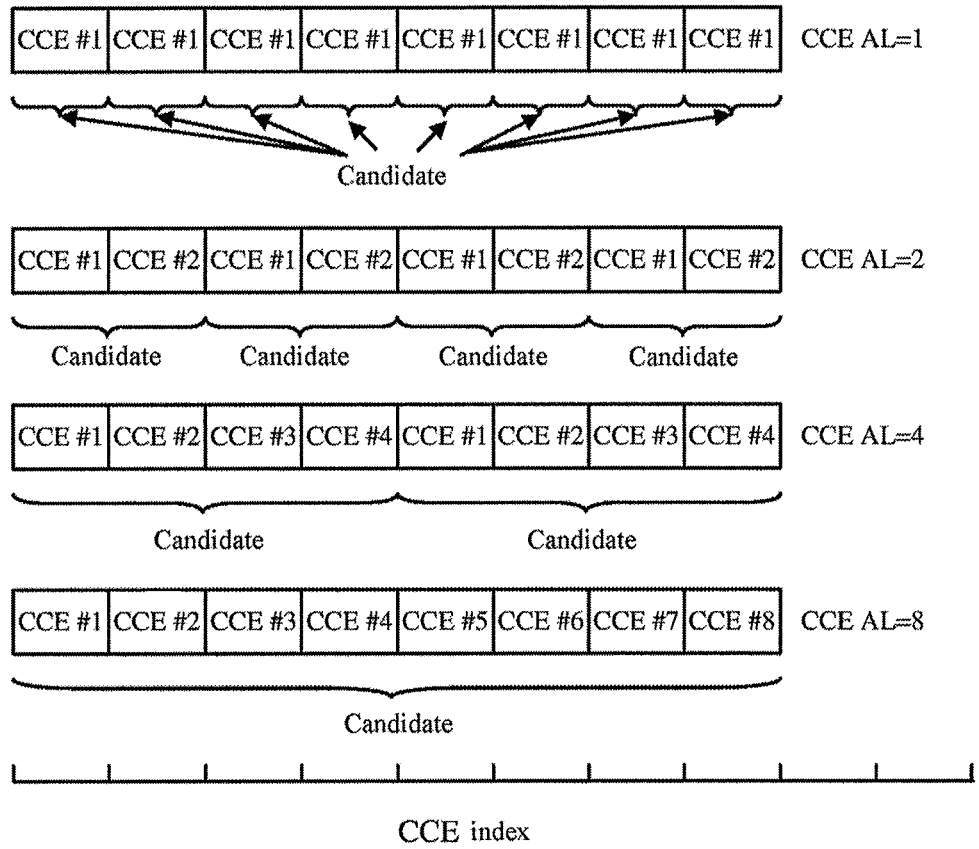

Determining a time-frequency resource for a reference signal required by a control channel, where the time-frequency resource for the reference signal includes multiple sets of resource groups, and the resource group includes two resource elements (RE) that are consecutive in a frequency domain — S510

Transmitting the reference signal via the time-frequency resource for the reference signal — S520

FIG. 5

METHOD FOR TRANSMITTING SIGNAL, NETWORK DEVICE AND TERMINAL DEVICE

CROSS-REFERENCE TO RELATED APPLICATIONS

This application is a continuation application of the International application PCT/CN2016/110750, filed on Dec. 19, 2016, entitled "METHOD FOR TRANSMITTING SIGNAL, NETWORK DEVICE AND TERMINAL DEVICE", the content of which is hereby incorporated by reference in its entirety.

TECHNICAL FIELD

The present application relates to the field of communications, and more particularly, to a method for transmitting a signal, a network device and a terminal device.

BACKGROUND

The downlink control channel of the Long Term Evolution (LTE) system is transferred on the first several orthogonal frequency division multiplexing (OFDM) symbols of each time domain scheduling unit (called "subframe" in LTE). Demodulation of a control signal is based on a common reference signal or a cell-specific reference signal. The common reference signal is shared by all terminal devices in a system and transferred according to a certain density and a certain mode across a whole system bandwidth.

The advantage of using the common reference signal as a downlink control signal demodulation is that it is always transmitted in each subframe and across the whole system bandwidth, thus guaranteeing a quality of channel estimation. The disadvantage thereof is that no precoding or beamforming corresponding to certain terminal devices can be applied thereon. Improvement is required in a 5G system using precoding or beamforming in large numbers.

Therefore, there is a need for a technical solution for transmitting a reference signal suitable for the 5G system to improve system performance.

SUMMARY

Embodiments of the present application provide a method for transmitting a signal, a network device and a terminal device, which can improve performance of the system.

In a first aspect, a method for transmitting a signal is provided, including:

determining a time-frequency resource for a reference signal required by a control channel, where the time-frequency resource for the reference signal includes multiple sets of resource groups, and the resource group comprises two resource elements (RE) that are consecutive in a frequency domain;

transmitting the reference signal via the time-frequency resource for the reference signal.

In embodiments of the present application, the time-frequency resource for the reference signal uses multiple sets of two REs that are consecutive in a frequency domain. In this way, the effect of channel estimation can be enhanced by adjacent reference signals, thereby improving the performance of the system.

In some possible implementations, the time-frequency resource for the reference signal includes two resource groups in one control channel resource unit.

In some possible implementations, there are 4 REs between the two resource groups.

In some possible implementations, for a plurality of terminal devices, the time-frequency resource for the reference signal is mapped, along with a configured control channel resource unit where the time-frequency resource for the reference signal is located, in a first control region within a system bandwidth in a manner of first a frequency domain and then a time domain.

In some possible implementations, the manner of first a frequency domain and then a time domain includes:

first mapping a first orthogonal frequency division multiplexing (OFDM) symbol in the first control region along the frequency domain, and then mapping the next OFDM symbol in the first control region.

In some possible implementations, the time-frequency resource for the reference signal of the same terminal device is located on one OFDM symbol.

In some possible implementations, for a plurality of terminal devices, the time-frequency resource for the reference signal is mapped, along with a configured control channel resource unit where the time-frequency resource for the reference signal is located, in a first control region within a system bandwidth in a manner of first a time domain and then a frequency domain.

In some possible implementations, the manner of first a time domain and then a frequency domain includes:

first mapping an OFDM symbol on a first physical resource block (PRB) in the first control region along the time domain, and then mapping the next OFDM symbol on the next PRB in the first control region.

In some possible implementations, for adjacent OFDM symbols of the same PRB, there is a shift between locations of the time-frequency resource for the reference signal.

In some possible implementations, for control regions with different numbers of OFDM symbols, the time-frequency resource for the reference signal occupies at least the first and last OFDM symbols of the control regions.

In some possible implementations, when adjacent beams transmit the reference signal to different terminal devices, for the adjacent beams, there is a shift between locations of the time-frequency resource for the reference signal.

In some possible implementations, for different beams, the shift between the locations of the time-frequency resource for the reference signal is determined at least according to a beam number.

In some possible implementations, when adjacent beams transmit the reference signal to the same terminal device using a joint transmission mode, locations of the time-frequency resource for the reference signal are the same for the adjacent beams.

In some possible implementations, for different terminal devices, the shift between the locations of the time-frequency resource for the reference signal is determined at least according to a wireless network temporary identifier (RNTI) of the terminal device.

In some possible implementations, a location of the time-frequency resource for the reference signal in a control channel unit is neither relevant to a location of a control channel candidate nor to a number of control channel units occupied by the control channel candidate.

In some possible implementations, the method further includes:

generating a sequence of the reference signal according to at least one of the followings:

an index of a resource block in a control region, a RNTI of a terminal device, a beam number or a virtual identifier.

In some possible implementations, the method further includes:

transmitting reference signal configuration information, where the reference signal configuration information includes time-frequency resource location information of the reference signal.

In some possible implementations, the reference signal configuration information further includes sequence information of the reference signal.

In a second aspect, a method for transmitting a signal is provided, including:

determining a time-frequency resource for a reference signal required by a control channel, where the time-frequency resource for the reference signal includes multiple sets of resource groups, and the resource group includes two resource elements (RE) that are consecutive in a frequency domain;

receiving the reference signal via the time-frequency resource for the reference signal;

demodulating the control channel according to the reference signal.

In some possible implementations, before the determining a time-frequency resource for a reference signal required by a control channel, the method further includes:

receiving reference signal configuration information transmitted by a network device, where the reference signal configuration information includes time-frequency resource location information of the reference signal;

where the determining a time-frequency resource for a reference signal required by a control channel includes:

determining the time-frequency resource for the reference signal according to the reference signal configuration information.

In some possible implementations, the reference signal configuration information further includes sequence information of the reference signal.

In a third aspect, a network device is provided, which includes modules that perform a method in the first aspect or in any possible implementations of the first aspect.

In a fourth aspect, a terminal device is provided, which includes modules that perform a method in the second aspect or a method in any possible implementation of the second aspect.

In a fifth aspect, a network device is provided, which includes a processor, a memory and a communication interface. The processor is connected to both of the memory and the communication interface. The memory is configured to store instructions, the processor is configured to execute the instructions, and the communication interface is configured to communicate with other network elements under the control of the processor. When the processor executes the instructions stored in the memory, the execution causes the processor to perform a method in the first aspect or a method in any possible implementation of the first aspect.

In a sixth aspect, a terminal device is provided, which includes a processor, a memory and a communication interface. The processor is connected to both of the memory and the communication interface. The memory is configured to store instructions, the processor is configured to execute the instructions, and the communication interface is configured to communicate with other network elements under the control of the processor. When the processor executes the instructions stored in the memory, the execution causes the processor to perform a method in the second aspect or a method in any possible implementation of the second aspect.

In a seventh aspect, a computer readable medium is provided for storing a computer program, the computer program includes instructions for performing a method in the first aspect or a method in any possible implementation of the first aspect.

In an eighth aspect, a computer readable medium is provided for storing a computer program, the computer program includes instructions for performing a method in the second aspect or a method in any possible implementation of the second aspect.

BRIEF DESCRIPTION OF DRAWINGS

FIG. 4 is a schematic diagram of control channel candidates according to an embodiment of the present application;

FIG. 5 is a schematic flowchart of a method for transmitting a signal according to an embodiment of the present application;

DESCRIPTION OF EMBODIMENTS

Technical solutions in embodiments of the present application will be described below with reference to the accompanying drawings in the embodiments of the present application.

Figure 1:
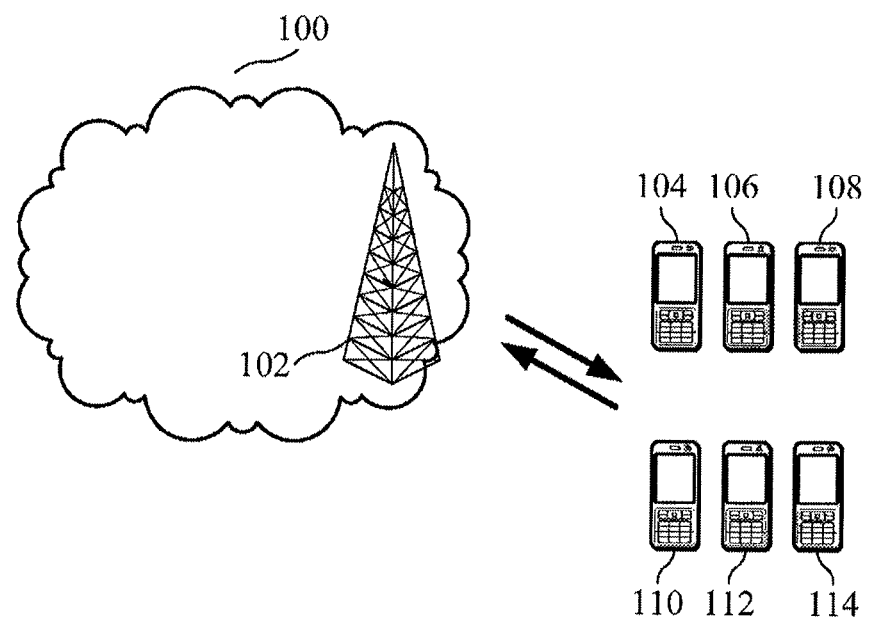
FIG. 1 is a schematic diagram of a communication system where an embodiment of the present application may be applied.

FIG. 1 is a schematic diagram of a communication system where an embodiment of the present application may be applied. As shown in FIG. 1, a network 100 may include a network device 102 and terminal devices 104, 106, 108, 110, 112 and 114, where the network device and the terminal devices are wirelessly connected. It should be understood that FIG. 1 only takes a network including one network device as an example for illustration, but embodiments of the present application are not limited thereto. For example, the network may further include more network devices;

similarly, the network may also include more terminal devices, and the network device may also include other devices.

The present application describes various embodiments in connection with a terminal device. The terminal device may also refer to a user equipment (User Equipment, UE), an access terminal, a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a session initiation protocol (SIP) phone, a wireless local loop (WLL) station, a personal digital assistant (short for "PDA"), a handheld device being capable of wireless communication, a computing device or other processing devices connected to a wireless modem, an on-board device, a wearable device, a terminal device in a future 5G network, or a terminal device in a future evolutional public land mobile network (PLMN), etc.

The present application describes various embodiments in connection with a network device. The network device may be a device for communicating with a terminal device, or the network device may be a base transceiver station (Base Transceiver Station, BTS) in GSM or CDMA, or a base station (NodeB, NB) in a Wideband Code Division Multiple Access (WCDMA) system, or may be an evolutional base station (Evolutional Node B, eNB or eNodeB) in a Long Term Evolution (LTE) system, or may also be a wireless controller in a cloud radio access network (Cloud Radio Access Network, CRAN) scenario; alternatively, the network device may be a relay station, an access point, a on-board device, a wearable device, a network device in a future 5G network or a network device in a future evolutional PLMN network, etc.

There are at least two kinds of downlink control channels in the 5G system, one is a common control channel, and the other is a UE-specific downlink control channel. The common control channel is configured to broadcast some common information to all terminal devices or to a part of terminal devices. The UE-specific downlink control channel serves to transmit downlink related control information, such as a configuration signal related to data transferring, to a specified terminal device. The terminal device determines whether there is downlink data transferring from a network by detecting, in a downlink time domain scheduling unit (such as a slot or mini-slot), UE-specific downlink control information, and demodulates downlink data by using a related configuration signal. The technical solution of the embodiment of the present application may be applied to a UE-specific downlink control channel.

Figure 2:
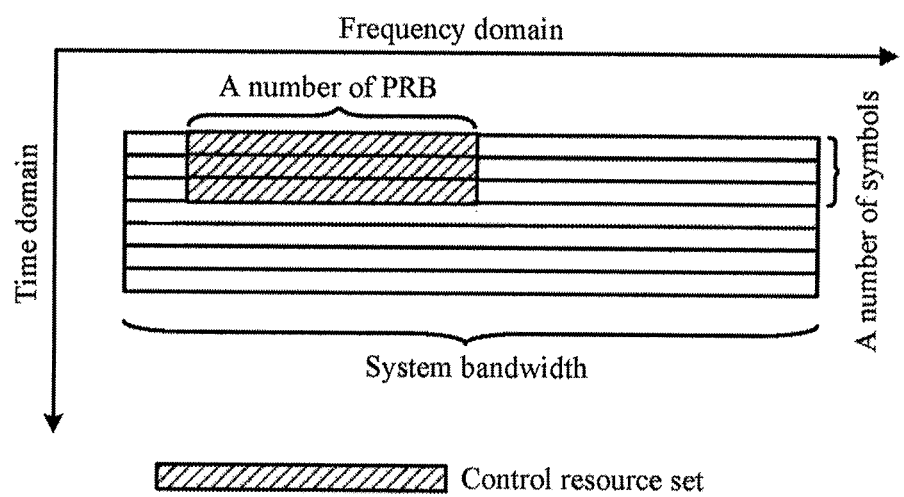
FIG. 2 is a schematic diagram of a resource set according to an embodiment of the present application.

Unlike the 4G system, in the 5G system, a downlink control region, also called a control resource set, covers only a part of frequency domain resources instead of a whole system bandwidth in a frequency domain. This region may be composed of a number of physical resource blocks (PRBs) that are consecutive or non-consecutive in the frequency domain. This is because the frequency band covered by the 5G system may be very wide (especially in a high frequency band), so a lot of terminal device resources may be consumed if the terminal is made to detect the control channel over the entire frequency band. In a time domain, a downlink control region is composed of one or several OFDM symbols, rather than all OFDM symbols in a time domain scheduling unit. In general, these OFDM symbols are located at the beginning of the downlink time domain scheduling unit. The purpose of such a design is to give the terminal device sufficient time to complete the demodulation of a data channel after the detection of the control signal by the terminal device, so as to meet needs of some applications, especially needs of a low-latency application. FIG. 2 shows such a resource set.

The transferring of a general control channel goes through the following steps: the control signal is appended with a cyclic error correction code at the end, and undergoes control channel encoding, modulation and preprocessing (e.g., using transmission diversity or beamforming), and is then transmitted over allocated physical resources.

Figure 3:
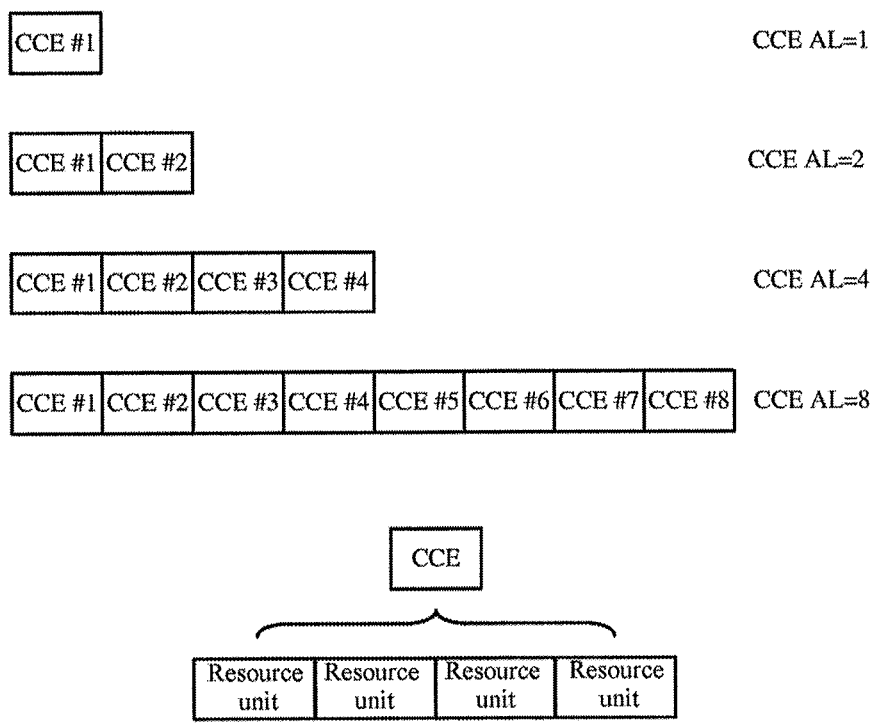
FIG. 3 is a schematic diagram of control channel elements according to an embodiment of the present application.

Since the load amount of the control channel is different, the encoded code rate is thus different (depending on channel quality and bit error rate requirements). One downlink control channel can be transmitted over one or several control channel elements (CCE), such as 1, 2, 4, 8 . . . control channel elements, which is also called a CCE aggregation level (CCE AL). As shown in FIG. 3, one control channel element can be further composed of several control resource units, one control resource unit is one time-frequency resource composed of one physical resource block (PRB) in a frequency domain and one (or several) OFDM symbol(s) in a time domain, and the time-frequency resource can be regarded as the smallest resource unit used for control channel transmission.

A downlink control region can be shared by multiple terminal devices, meaning that all their downlink control channels will be transmitted in this downlink control region. Generally, a terminal device needs to search and blindly detect in a corresponding downlink control region in the time domain scheduling unit to obtain its own downlink control channel. In order to avoid collision of downlink control channels for different terminal devices in the same downlink control region, the downlink control channel transmitted to each terminal device needs to be transmitted on a specific resource, and the terminal device also needs to search and blindly detect on the specific resource for its own downlink control channel. These specific resources and different control channel candidates (such as candidates based on the same or different CCE ALs) that may be transmitted thereon, are collectively referred to as a search space of the downlink control channel for the terminal device.

FIG. 4 shows an instance of different downlink control channel candidates, based on the same or different control channel element aggregation levels, for a terminal device. For example, there may be 8 candidates based on CCE AL=1. For example, there may be 4 candidates based on CCE AL=2. For example, there may be 2 candidates based on CCE AL=4. For example, there may be 1 candidate based on CCE AL=8. Resources used by these candidates may overlap completely or partially, or may not overlap. For a terminal device, it may not know which candidate (including candidates based on the same or different control channel element aggregation levels) is used by the network side to transmit its control channel, so it needs to blindly detect its own control channel on resources for all possible candidates. If no control signal which belongs to the terminal device is detected on all possible candidates, the terminal device has to assume that the network side has not transmitted any control signal to it in the current scheduling unit.

The reference signal is used to estimate a channel response, so as to assist demodulation for a control channel. Its design is directly related to the performance of the control channel and the performance of the entire system. In view of this, the present application provides a design scheme for a reference signal to improve the performance of the system.

FIG. 5 shows a schematic flowchart of method 500 for transmitting a signal according to an embodiment of the present application. The method 500 is performed by a network device, such as the network device 102 in FIG. 1. As shown in FIG. 5, the method 500 includes:

S510, determining a time-frequency resource for a reference signal required by a control channel, where the time-frequency resource for the reference signal includes multiple sets of resource groups, and the resource group includes two resource elements (RE) that are consecutive in a frequency domain;

S520, transmitting the reference signal via the time-frequency resource for the reference signal.

In an embodiment of the present application, the time-frequency resource for the reference signal uses multiple sets of two resource elements (REs) that are consecutive in the frequency domain. In this way, the effect of channel estimation can be enhanced by adjacent reference signals, thereby improving the performance of the system.

In an embodiment, time-frequency resource for the reference signal includes two resource groups in one control channel resource unit.

In an embodiment, there are 4 REs between the two resource groups.

Since one control channel resource unit is one PRB in the frequency domain, there are 12 resource elements in total, except for 4 resource elements for transmitting the reference signal, a total of 8 resource elements can be used to transmit a control signal.

In an embodiment, a location of the time-frequency resource for the reference signal in a control channel unit are neither relevant to a location of a control channel candidate nor to the number of control channel units occupied by the control channel candidate.

That is, the reference signals having the same pattern can be used for different control channel candidates and different control channel element aggregation levels.

In an embodiment, for a plurality of terminal devices, the time-frequency resource for the reference signal is mapped, along with a configured control channel resource unit where the time-frequency resource for the reference signal is located, in a first control region within a system bandwidth in a manner of first a frequency domain and then a time domain.

For example, the manner of first a frequency domain and then a time domain includes:

first mapping a first orthogonal frequency division multiplexing (OFDM) symbol in the first control region along the frequency domain, and then mapping the next OFDM symbol in the first control region.

Figure 6:
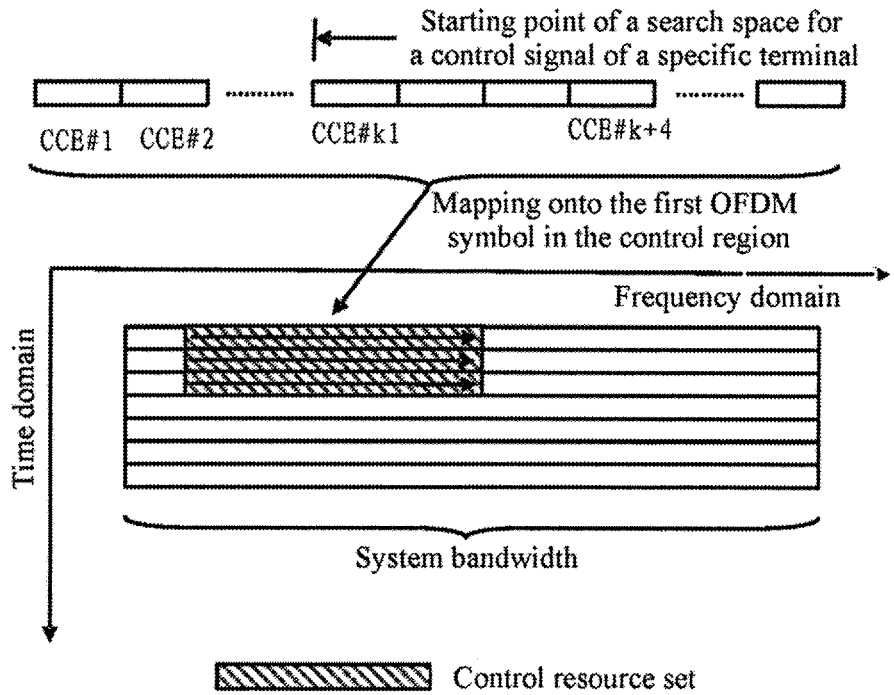
FIG. 6 is a schematic diagram of a mapping manner according to an embodiment of the present application.

For example, as shown in FIG. 6, the first control region may include one or several OFDM symbols, and mapping of control channel elements is performed first along the frequency domain and then along the time domain (if there are multiple OFDM symbols).

When the manner of first the frequency domain then the time domain is applied, the time-frequency resource for the reference signal of the same terminal device may be located on one OFDM symbol.

Figure 7:
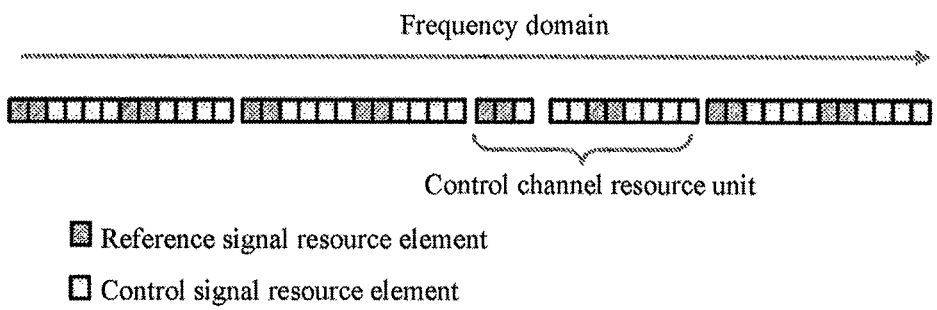
FIG. 7 to FIG. 9 are schematic diagrams of reference signal designs according to an embodiment of the present application.
Figure 8:
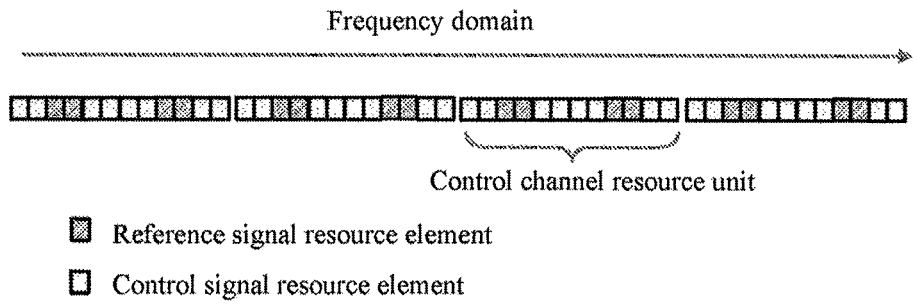
Figure 9:
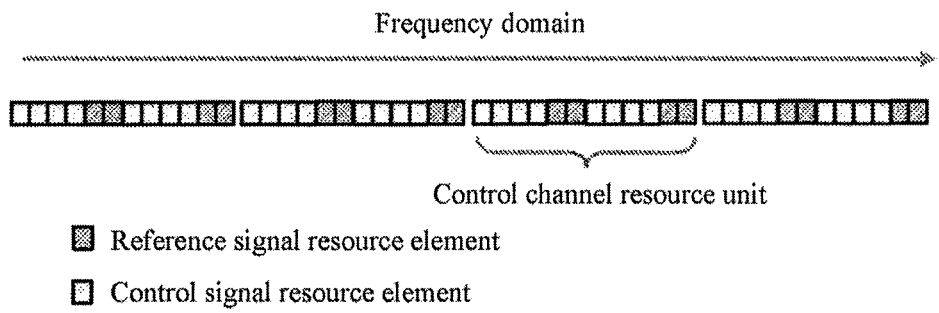

For example, when the manner of first the frequency domain then the time domain is applied, the reference signal can use the design shown from FIG. 7 to FIG. 9.

The effect of channel estimation can be enhanced by using adjacent reference signals assigned to control channel resource units for the same terminal.

Since different candidates based on the same or different control channel element aggregation levels of a control channel use overlapping search spaces, the channel response estimated over reference signal resources in the same control channel resource unit can be used by a terminal for performing blind detection on candidates which are based on different the control channel element aggregation levels. In this way, the estimated channel response over the reference signal resources can be multiplexed, thereby reducing the complexity of the channel estimation performed by the terminal device.

The use of two adjacent frequency domain resources as reference signal resources can support two-port reference signals as well as different port resources multiplexing. Preprocessing such as beamforming can be applied to the reference signal.

The reference signal of embodiments of the present application can be used in a beamforming system. In an embodiment, in order to reduce collision between reference signals in adjacent beams and ensure the quality of the channel estimation, a certain shift between locations of the reference signals for the adjacent beams may be considered.

FIG. 7 to FIG. 9 show three different shift reference signal modes, and there is a shift of two resource elements between, locations of the reference signals in different shift reference signal modes, but this is not limited in embodiments of the present application. If these different shift reference signal modes are used for different beams, it means that there is a shift of two resource elements between locations of corresponding reference signals over different beams, thus avoiding collision between reference signals.

In an embodiment, when adjacent beams transmit the reference signal to different terminal devices, there is a shift between locations of the time-frequency resource for the reference signal for the adjacent beams.

In this case, in an embodiment, for different beams, the shift between the locations of the time-frequency resource for the reference signal is determined at least according to a beam number.

For example, it can be determined in following manners, a sequence number of the shift reference signal mode (e.g., 0, 1, N−1)=the beam number mod(N), where N is the number of possible shift reference signal modes (which is 3 as shown above).

In an embodiment, when adjacent beams transmit the reference signal to the same terminal device using a joint transmission mode, locations of the time-frequency resource for the reference signal are the same for the adjacent beams.

In this case, in an embodiment, for different terminal devices, the shift between the locations of the time-frequency resource for the reference signal is determined at least according to a wireless network temporary identifier (RNTI) of the terminal device.

For example, it can be determined in following manners, a sequence number of the shift reference signal mode (e.g., 0, 1, N−1)=RNTI mod(N), where N is the number of possible shift reference signal modes (it is 3 as shown above).

In another embodiment, for a plurality of terminal devices, the time-frequency resource for the reference signal is mapped, along with a configured control channel resource unit where the time-frequency resource for the reference signal is located, in a first control region within a system bandwidth in a manner of first a time domain and then a frequency domain.

For example, the manner of first a time domain and then a frequency domain includes:

first mapping an OFDM symbol on a first physical resource block (PRB) in the first control region along the time domain, and then mapping the next OFDM symbol on the next PRB in the first control region.

Figure 10:
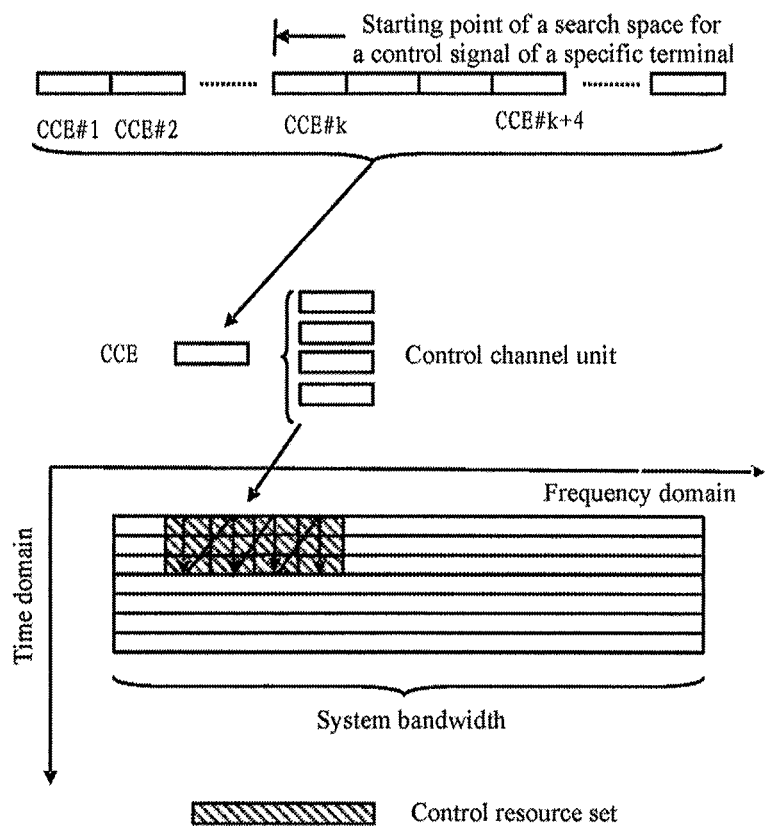
FIG. 10 is a schematic diagram of a mapping manner according to another embodiment of the present application.

For example, as shown in FIG. 10, the first control region may include one or several OFDM symbols, and mapping of control channel elements is performed first in a physical resource block along the time domain, and then in the next physical resource block along the frequency domain.

In an embodiment, when the manner of first a time domain and then a frequency domain is used, there is a shift between locations of the time-frequency resource for the reference signal for adjacent OFDM symbols of the same PRB.

For example, when the manner of first a time domain and then a frequency domain is used, the reference signal can use the designs as shown from FIG. 11 to FIG. 15.

Figure 11:
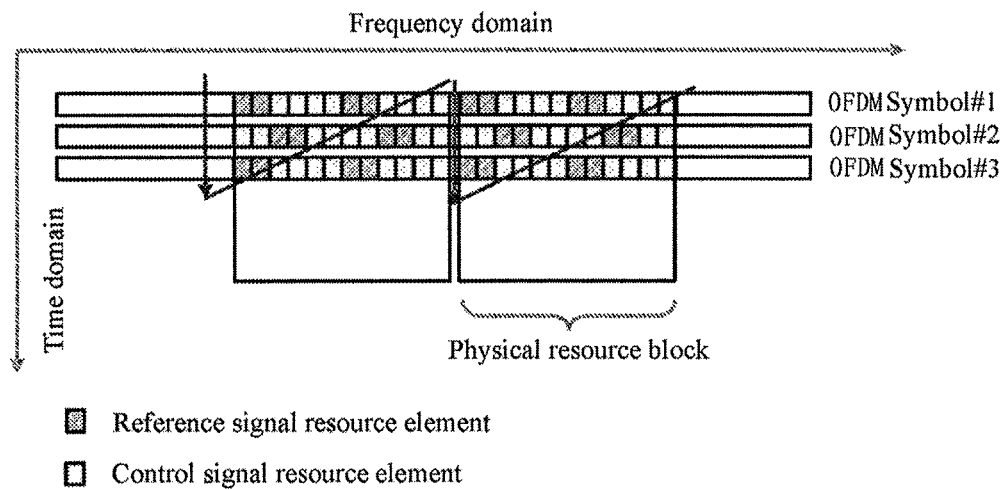
FIG. 11 to FIG. 18 are schematic diagrams of reference signal designs according to another embodiment of the present application.
Figure 12:
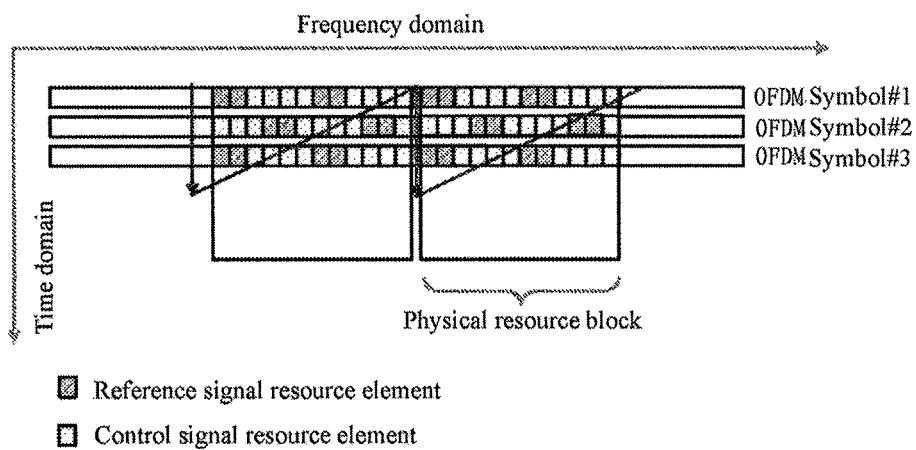

In an embodiment, there may be a shift of one or several resource elements between reference signal resources on adjacent OFDM symbols of the same physical resource block, which facilitates better interpolation during channel estimation. In FIG. 11, the shift is two resource elements, in this way, at least two control channel resource elements are kept consecutive in the frequency domain, which is convenient for supporting transmission diversity (it is desirable in this transmission manner that the paired SFBC resources are consecutive in the frequency domain) based on a space frequency block code (SFBC). The shift between reference signal resources on adjacent OFDM symbols in FIG. 12 is 3 resource elements. It should be understood that the embodiment of the present application does not limit the number of shifted resource elements.

The effect of channel estimation can be enhanced by using reference signals assigned to control channel resource units for the same terminal over adjacent OFDM symbols. Each control channel resource unit (one physical resource block and time-frequency resources for one OFDM symbol) includes a reference signal, thus can independently complete its own channel estimation, and can also use a reference signal over an adjacent resource unit to enhance the quality of the channel estimation. This design does not change with the number of control resource units to which it belongs, thereby avoiding the over-complex design and unnecessary configuration signaling, and reducing the channel estimation complexity of the terminal device.

Since different candidates based on the same or different control channel element aggregation levels of a control channel use overlapping resources, the channel response estimated on the reference signal included in the same control channel resource unit can be used by the terminal device to blindly detect different control channel candidates, thereby greatly reducing the complexity in channel estimation by the terminal device.

The use of two adjacent frequency domain resources as reference signal resources can support two-port reference signals as well as different port resources multiplexing. Preprocessing such as beamforming can be applied to the reference signal.

Figure 13:
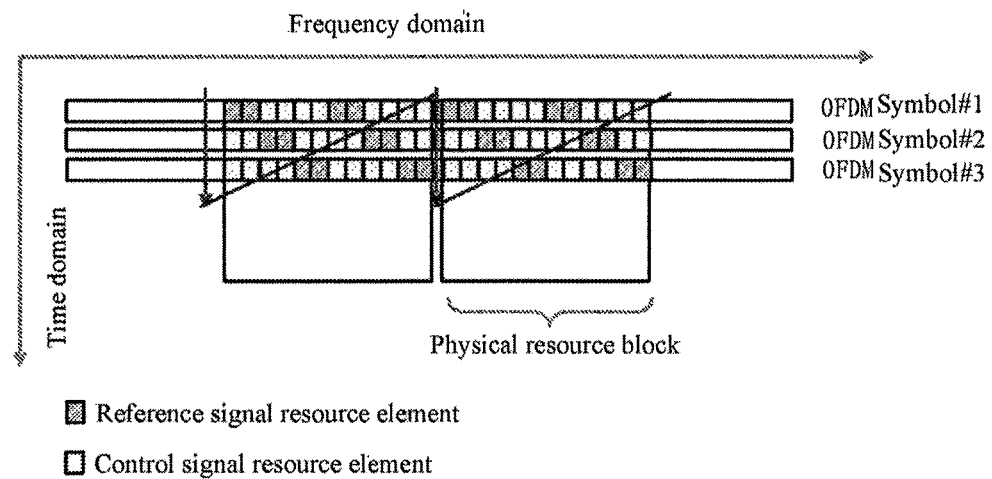
Figure 14:
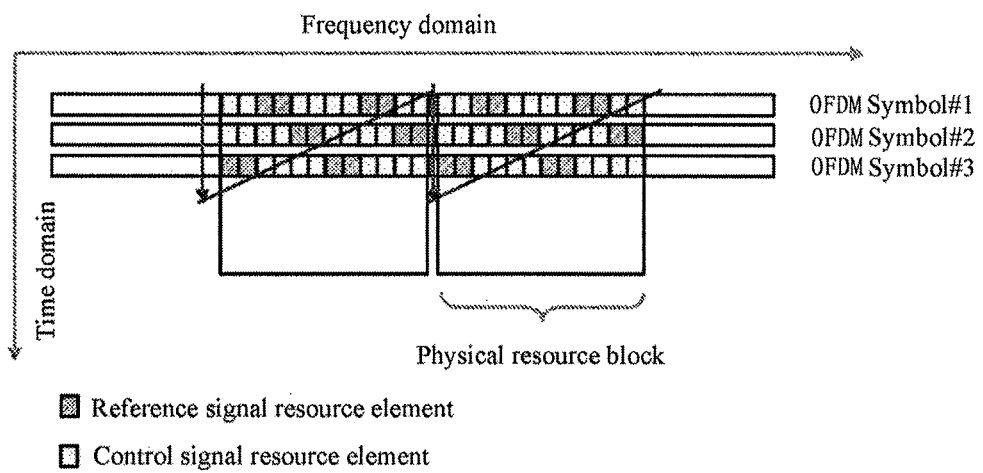
Figure 15:
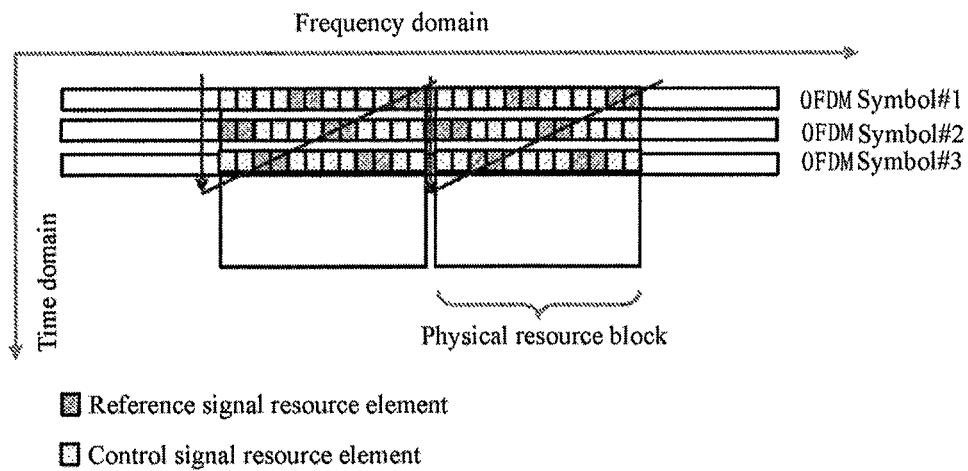

Similar to the foregoing embodiment, in the present embodiment, mutual influence (such as interference) between reference signals over adjacent beams can also be considered, and the interference can be reduced by applying the shift design. FIG. 13 to FIG. 15 are three different shift reference signal modes, and there is a shift of two resource elements between locations of the reference signals between different shift reference signal modes, but it is not limited in the embodiment of the present application. If these different shift reference signal modes are used for different beams, it means that there is a shift of two resource elements between locations of corresponding reference signals over different beams. Reference may be made to the foregoing embodiments for the determination of the shift, which is not described herein again for brevity.

In an embodiment, for control regions with different numbers of OFDM symbols, the time-frequency resource for the reference signal occupies at least the first and last OFDM symbols of the control regions.

Figure 16:
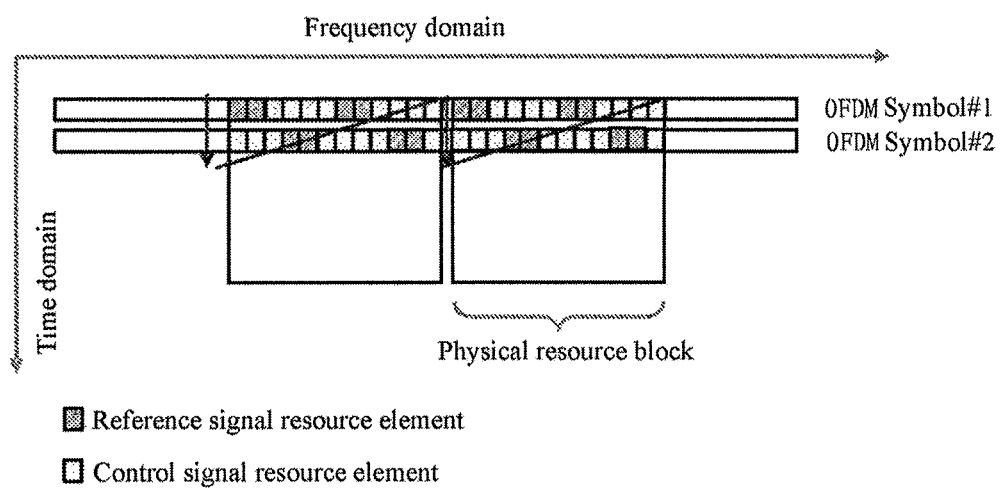
Figure 17:
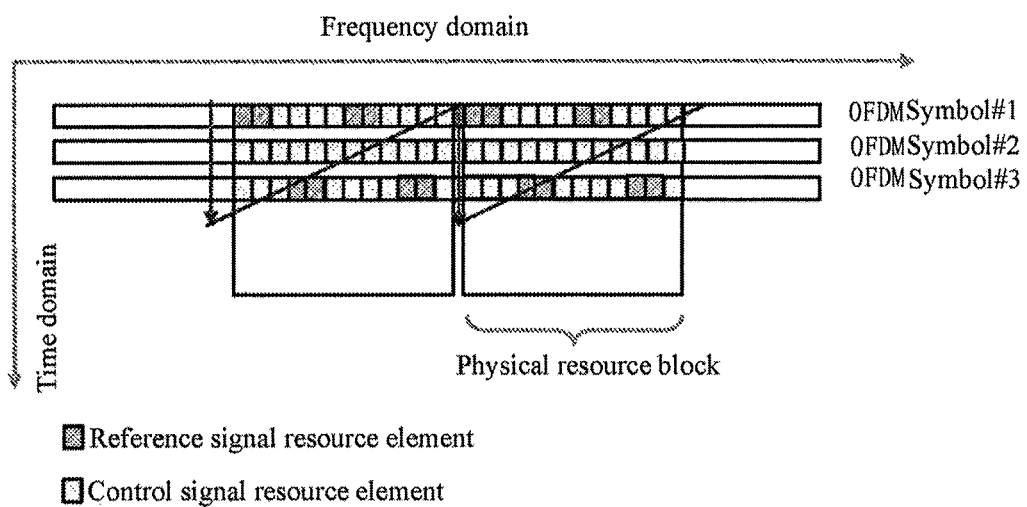
Figure 18:
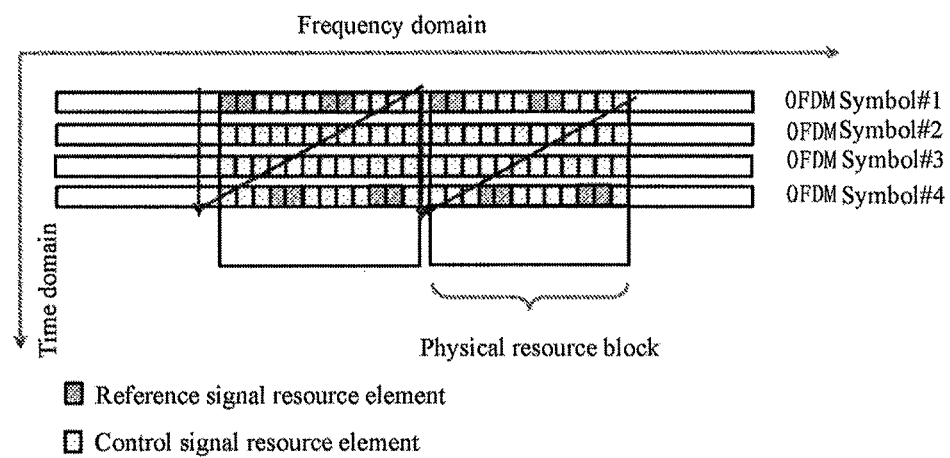

For example, as shown from FIG. 16 to FIG. 18, with regard to different sizes of control regions, the reference signal may be transmitted over the same number of OFDM symbols, for example, the first and last OFDM symbols of the control regions, thus facilitating interpolation during channel estimation. Compared with the design embodiment shown in FIG. 16, the design embodiment shown in FIG. 17 is directed to a control signal resource set having 3 OFDM symbols, and no reference signal is transmitted over the second symbol in this design embodiment. The design embodiment shown in FIG. 18 is directed to a control signal resource set having 4 OFDM symbols, and no reference signal is transmitted over the second symbol and the third symbol in this design embodiment.

In an embodiment, the network device may generate a sequence of the reference signal according to at least one of the followings:

an index of a PRB in the control region, a RNTI of a terminal device, a beam number or a virtual identifier.

Where the index of the PRB in the control region may be a sequence number established based on the control region, or may be an absolute sequence number of the control region throughout the entire system bandwidth; the control channel transmits the sequence number of the used beam, If several beams simultaneously perform joint transmission, a virtual beam sequence number can be used.

The sequence of the reference signal thus generated may have the following functions:

reducing interference between adjacent beams;

supporting joint transmission between beams;

reducing interference between reference signals for different terminal devices, such as the case of the adjacent beams or Multi-User Multiple-Input Multiple-Output (MU-MIMO).

In an embodiment, the network device may further transmit reference signal configuration information, where the reference signal configuration information includes time-frequency resource location information of the reference signal.

In this way, the terminal device can determine the time-frequency resource for the reference signal according to the reference signal configuration information.

In an embodiment, the reference signal configuration information further includes sequence information of the reference signal.

The method for transmitting a signal according to the embodiment of the present application is described above from the network device side, and the method for transmitting a signal according to the embodiment of the present application will be described below from the terminal device side.

Figure 19:
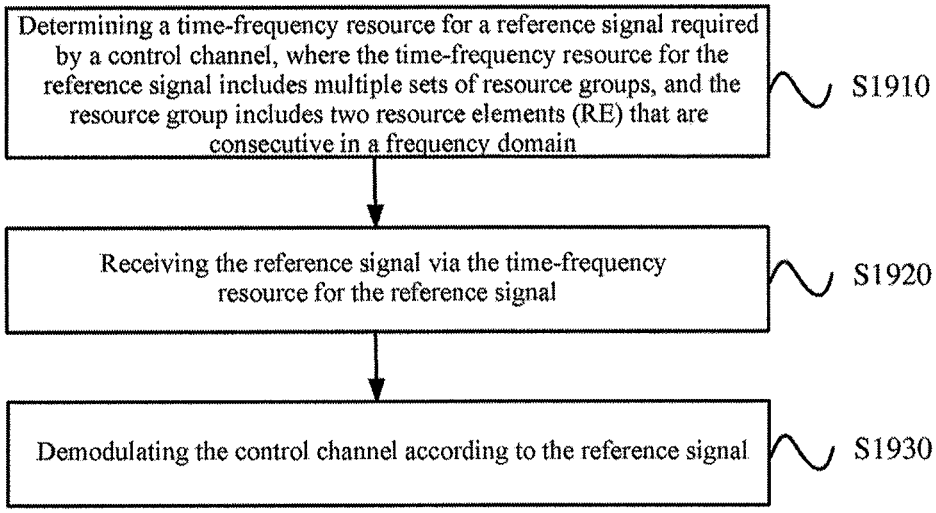
FIG. 19 is a schematic flowchart of a method for transmitting a signal according to another embodiment of the present application.

FIG. 19 shows a schematic flowchart of method 1900 for transmitting a signal according to an embodiment of the present application. The method 1900 is performed by a terminal device, such as the terminal device in FIG. 1. As shown in FIG. 19, the method 1900 includes:

S1910, determining a time-frequency resource for a reference signal required by a control channel, where the time-frequency resource for the reference signal includes multiple sets of resource groups, and the resource group includes two resource elements (RE) that are consecutive in a frequency domain;

S1920, receiving the reference signal via the time-frequency resource for the reference signal;

S1930, demodulating the control channel according to the reference signal.

In an embodiment, a terminal device may receive reference signal configuration information transmitted by a network device, where the reference signal configuration information includes time-frequency resource location information of the reference signal;

determining the time-frequency resource for the reference signal according to the reference signal configuration information.

In an embodiment, the reference signal configuration information further includes sequence information of the reference signal.

It should be understood that, in embodiments of the present application, the design of the reference signal described on the network device side, and the interaction between the network device and the terminal device, as well as related features, functions, and the like, correspond to the description of the terminal device side, which are not described again herein for brevity.

It should be understood that, in various embodiments of the present application, sizes of the sequence numbers for each foregoing process does not indicate the order of their execution, and the order for executing each process should be determined by its function and internal logic, and should not constitute any limitation on the implementation of embodiments of the present application.

The method for transmitting a signal according to embodiments of the present application is described above in detail, and the network device and the terminal device according to embodiments of the present application will be described below. It should be understood that the network device and the terminal device according to embodiments of the present application may perform various methods as described above in embodiments of the present application, that is, reference may be made to corresponding processes in the foregoing method embodiments for specific working processes of following various devices.

Figure 20:
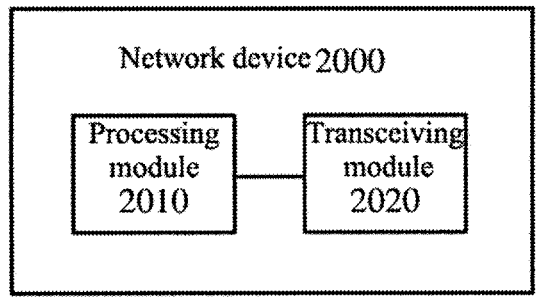
FIG. 20 is a schematic block diagram of a network device according to an embodiment of the present application.

FIG. 20 shows a schematic block diagram of network device 2000 according to an embodiment of the present application. As shown in FIG. 20, the network device 2000 includes:

A processing module 2010, configured to determine a time-frequency resource for a reference signal required by a control channel, where the time-frequency resource for the reference signal includes multiple sets of resource groups, and the resource group includes two resource elements (RE) that are consecutive in a frequency domain;

A transceiving module 2020, configured to transmit the reference signal via time-frequency resource for the reference signal.

In an embodiment, the time-frequency resource for the reference signal includes two resource groups in one control channel resource unit.

In an embodiment, there are 4 REs between the two resource groups.

In an embodiment, for a plurality of terminal devices, the time-frequency resource for the reference signal is mapped, along with a configured control channel resource unit where the time-frequency resource for the reference signal is located, in a first control region within a system bandwidth in a manner of first a frequency domain and then a time domain.

In an embodiment, the manner of first a frequency domain and then a time domain includes:

first mapping a first orthogonal frequency division multiplexing (OFDM) symbol in the first control region along the frequency domain, and then mapping the next OFDM symbol in the first control region.

In an embodiment, the time-frequency resource for the reference signal of the same terminal device is located on one OFDM symbol.

In an embodiment, for a plurality of terminal devices, the time-frequency resource for the reference signal is mapped, along with a configured control channel resource unit where the time-frequency resource for the reference signal is located, in a first control region within a system bandwidth in a manner of first a time domain and then a frequency domain.

In an embodiment, the manner of first a time domain and then a frequency domain includes:

first mapping an OFDM symbol on the first physical resource block (PRB) in the first control region along the time domain, and then mapping the next OFDM symbol on the next PRB in the first control region.

In an embodiment, for adjacent OFDM symbols of the same PRB, there is a shift between locations of the time-frequency resource for the reference signal.

In an embodiment, for control regions with different numbers of OFDM symbols, the time-frequency resource for the reference signal occupies at least the first and last OFDM symbols of the control regions.

In an embodiment, when adjacent beams transmit the reference signal to different terminal devices, for the adjacent beams, there is a shift between locations of the time-frequency resource for the reference signal.

In an embodiment, for different beams, the shift between the locations of the time-frequency resource for the reference signal is determined at least according to a beam number.

In an embodiment, when adjacent beams transmit the reference signal to the same terminal device using a joint transmission mode, locations of the time-frequency resource for the reference signal are the same for the adjacent beams.

In an embodiment, for different terminal devices, the shift between the locations of the time-frequency resource for the reference signal is determined at least according to a wireless network temporary identifier (RNTI) of a terminal device.

In an embodiment, a location of the time-frequency resource for the reference signal in a control channel unit is neither relevant to a location of a control channel candidate nor to a number of control channel units occupied by the control channel candidate.

In an embodiment, the processing module 2010 is further configured to:

generate a sequence of the reference signal according to at least one of the followings:

an index of a resource block in a control region, a RNTI of a terminal device, a beam number or a virtual identifier.

In an embodiment, the transceiving module 2020 is further configured to transmit reference signal configuration information, where the reference signal configuration information includes time-frequency resource location information of the reference signal.

In an embodiment, the reference signal configuration information further includes sequence information of the reference signal.

The network device 2000 according to the embodiment of the present application may correspond to the network device in the method for transmitting a signal according to the embodiment of the present application, where the above and other operations and/or functions of each module serve to implement corresponding processes for each of the above methods, respectively, which will not be described again herein for brevity.

Figure 21:
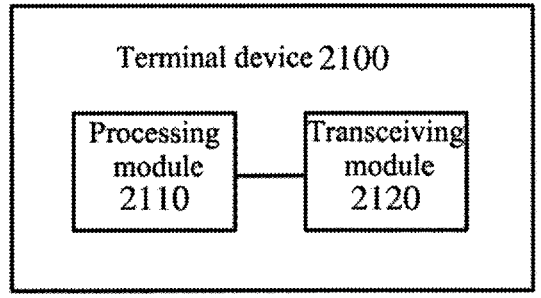
FIG. 21 is a schematic block diagram of a terminal device according to an embodiment of the present application.

FIG. 21 shows a schematic block diagram of terminal device 2100 according to an embodiment of the present application. As shown in FIG. 21, the terminal device 2100 includes:

a processing module 2110, configured to determine a time-frequency resource for a reference signal required by a control channel, where the time-frequency resource for the reference signal includes multiple sets of resource groups, and the resource group includes two resource elements (RE) that are consecutive in a frequency domain;

a transceiving module 2120, configured to receive the reference signal via time-frequency resource for the reference signal.

The processing module 2110 is further configured to demodulate the control channel according to the reference signal.

In an embodiment, the transceiving module 2120 is further configured to receive reference signal configuration information transmitted by a network device, where the reference signal configuration information includes time-frequency resource location information of the reference signal;

The processing module 2110 is specifically configured to determine the time-frequency resource for the reference signal according to the reference signal configuration information.

In an embodiment, the reference signal configuration information further includes sequence information of the reference signal.

Terminal device 2100 according to the embodiment of the present application may correspond to the terminal device in the method for transmitting a signal according to the embodiment of the present application, and the above and other operations and/or functions of each module of the terminal device 2100 serve to implement corresponding processes for each of the above methods, respectively, which will not be described again herein for brevity.

Figure 22:
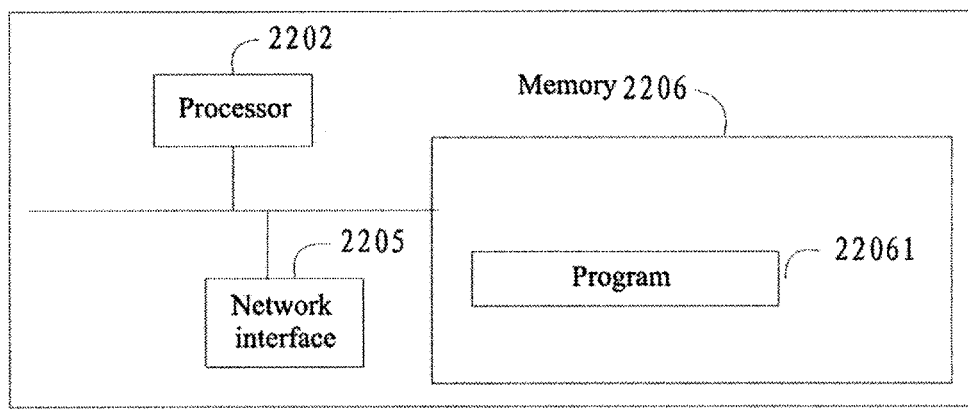
FIG. 22 is a schematic structural diagram of a network device according to another embodiment of the present application.

FIG. 22 shows a structure of a network device provided by still another embodiment of the present application, the network device includes at least one processor 2202 (such as a Central Processing Unit (CPU)), at least one network interface 2205 or other communication interfaces, and a memory 2206. These components are communicatively connected. The processor 2202 is configured to execute an executable module, such as a computer program, stored in the memory 2206. The memory 2206 may encompass a high speed random access memory (RAM), and may also include a non-volatile memory, for example, at least one disk memory. A communication connection with at least one of other network elements is achieved by at least one network interface 2205 (which may be wired or wireless).

In some implementations, the memory 2206 stores a program 22061, and the processor 2202 executes the program 22061 for performing methods in various embodiments of the present application described above.

Figure 23:
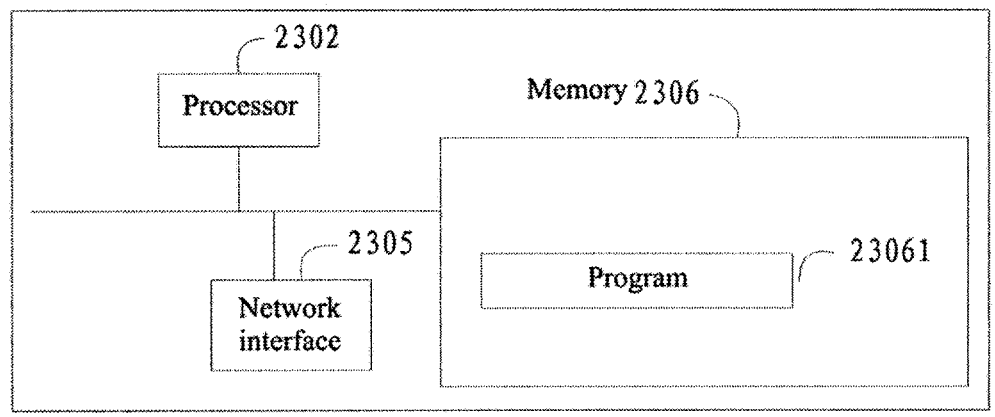
FIG. 23 is a schematic structural diagram of a terminal device according to another embodiment of the present application.

FIG. 23 shows a structure of a terminal device provided by still another embodiment of the present application, the terminal device includes at least one processor 2302 (such as a CPU), at least one network interface 2305 or other communication interfaces, and a memory 2306. These components are communicatively connected. The processor 2302 is configured to execute an executable module, such as a computer program, stored in the memory 2306. The memory 2306 may encompass a high speed random access memory (RAM), and may also include a non-volatile memory, for example, at least one disk memory. A communication connection with at least one of other network elements is achieved by at least one network interface 2305 (which may be wired or wireless).

In some implementations, the memory 2306 stores a program 23061, and the processor 2302 executes the program 23061 for performing methods in various embodiments of the present application described above.

It should be understood that the specific examples in embodiments of the present application are only intended to help those skilled in the art to better understand the embodiments of the present application, rather than limiting the scope of the embodiments of the present application.

It should be understood that in embodiments of the present application, the term "and/or" is merely an association relationship describing an associated object, indicating that there may be three relationships. For example, A and/or B may indicate that there are three cases: A exists individually; A and B exist simultaneously; B exists individually. In addition, the character "/" used herein generally indicates that the relationship between contextual objects is an "or" relationship.

One with ordinary skill in the art may appreciate that units and algorithm steps of various examples described in connection with the embodiments disclosed herein can be implemented in electronic hardware, computer software, or a combination of both, and composition and steps of the various examples have been generally described in terms of functionality in the foregoing description to clearly illustrate the interchangeability of hardware and software. Whether these functions are performed in hardware or software depends on the specific application and design constraints of the technical solution. Technical professionals may adopt different methods for each specific application to implement the described functions, but such implementation should not be considered to be beyond the scope of the present application.

A person skilled in the art can clearly understand that, for the convenience and brevity of the description, the specific working process of the system, the device and the unit described above can refer to the corresponding process in the foregoing method embodiment, and details are not described herein again.

In the several embodiments provided by the present application, it should be understood that the disclosed system, device and method may be implemented in other ways. For example, the apparatus embodiment described above is merely illustrative. For example, the division of the unit is only a logical function division. In actual implementation, there may be a further way for division, for example, multiple units or components may be combined or may be integrated into another system, or some features may be ignored or may not be performed. In addition, mutual coupling or direct coupling or communication connections shown or discussed may be indirect coupling or communication connections through some interfaces, apparatus or units, or may also be electrical, mechanical or other forms of connection.

The units described as separate components may be or may not be physically separated, and the components displayed as units may be or may not be physical units, that is, they may be located in one place, or may be distributed to multiple network units. Some or all of the units thereof may be selected according to actual needs to achieve the purpose of the embodiments of the present application.

In addition, each functional unit in various embodiments of the present application may be integrated into one processing unit, or each unit may exist physically and separately, or two or more units may be integrated into one unit. The above integrated unit may be implemented in the form of hardware or in the form of a software functional unit.

The integrated unit, if implemented in the form of a software functional unit and sold or used as an independent product, may be stored in a computer readable storage medium. Based on such understanding, the technical solution of the present application essentially, or the part of the technical solution of the present application that contributes to the prior art, or all or part of the technical solution, may be embodied in the form of a software product, the computer software product is stored in a storage medium, which includes a number of instructions to enable a computer device (may be a personal computer, a server, a network device, etc.) to perform all or part of the steps described in each embodiment of the present application. The foregoing storage medium includes various media which can store a program code: a Universal Serial Bus (USB) flash drive, a mobile hard disk, a read-only memory (ROM), a random access memory (RAM), a magnetic disk, or an optical disk, and the like.

The above description is only the specific implementation of the present application, but the protection scope of the present application is not limited thereto, and it is easy for those skilled in the art to think of equivalent modifications or substitutions within the technical scope disclosed by the present application, and such modifications or substitutions are intended to be covered within the protection scope of the present application. Therefore, the protection scope of the present application shall be subject to that of the claims.

What is claimed is:

1. A method for transmitting a signal, applied to a terminal device, comprising:
   determining a time-frequency resource for a reference signal required by a control channel, wherein the time-frequency resource for the reference signal comprises multiple sets of resource groups, and the resource group comprises two resource elements (RE) that are consecutive in a frequency domain;
   receiving the reference signal via the time-frequency resource for the reference signal; and
   demodulating the control channel according to the reference signal;
   wherein for a plurality of terminal devices comprising the terminal device, the time-frequency resource for the reference signal is mapped, along with a configured control channel resource unit where the time-frequency resource for the reference signal is located, in a first control region within a system bandwidth in a manner of first a frequency domain and then a time domain;
   wherein when different terminal devices comprising the terminal device receive the reference signal transmitted by adjacent beams, for the adjacent beams, there is a shift between locations of the time-frequency resource for the reference signal.

2. The method according to claim 1, wherein before the determining a time-frequency resource for a reference signal required by a control channel, the method further comprises:
   receiving reference signal configuration information transmitted by a network device, wherein the reference signal configuration information comprises time-frequency resource location information of the reference signal;
   wherein the determining a time-frequency resource for a reference signal required by a control channel comprises:
   determining the time-frequency resource for the reference signal according to the reference signal configuration information.

3. A network device, comprising a processor and a memory having executable instructions stored thereon that when executed by the processor cause the processor to:
   determine a time-frequency resource for a reference signal required by a control channel, wherein the time-frequency resource for the reference signal comprises multiple sets of resource groups, and the resource group comprises two resource elements (RE) that are consecutive in a frequency domain; and
   control a communication interface to transmit the reference signal via time-frequency resource for the reference signal;
   wherein for a plurality of terminal devices, the time-frequency resource for the reference signal is mapped, along with a configured control channel resource unit where the time-frequency resource for the reference signal is located, in a first control region within a system bandwidth in a manner of first a frequency domain and then a time domain;
   wherein when adjacent beams transmit the reference signal to different terminal devices, for the adjacent beams, there is a shift between locations of the time-frequency resource for the reference signal.

4. The network device according to claim 3, wherein the time-frequency resource for the reference signal comprises two resource groups in one control channel resource unit.

5. The network device according to claim 4, wherein there are 4 REs between the two resource groups.

6. The network device according to claim 3, wherein the time-frequency resource for the reference signal of the same terminal device is located on one OFDM symbol.

7. The network device according to claim 3, wherein for different beams, the shift between the locations of the time-frequency resource for the reference signal is determined at least according to a beam number.

8. The network device according to claim 3, wherein when adjacent beams transmit the reference signal to the same terminal device using a joint transmission mode, locations of the time-frequency resource for the reference signal are the same for the adjacent beams.

9. The network device according to claim 8, wherein for different terminal devices, a shift between the locations of the time-frequency resource for the reference signal is determined at least according to a wireless network temporary identifier (RNTI) of a terminal device.

10. The network device according to claim 3, wherein a location of the time-frequency resource for the reference signal in a control channel unit is neither relevant to a location of a control channel candidate nor to a number of control channel units occupied by the control channel candidate.

11. The network device according to claim 3, wherein the processor is further configured to:
generate a sequence of the reference signal according to at least one of the followings:
an index of a resource block in a control region, a RNTI of a terminal device, a beam number or a virtual identifier.

12. The network device according to claim 3, wherein the processor is further configured to control the communication interface to transmit reference signal configuration information, wherein the reference signal configuration information comprises time-frequency resource location information of the reference signal.

13. The network device according to claim 12, wherein the reference signal configuration information further comprises sequence information of the reference signal.

14. A terminal device, comprising a processor and a memory having executable instructions stored thereon that when executed by the processor cause the processor to:
determine a time-frequency resource for a reference signal required by a control channel, wherein the time-frequency resource for the reference signal comprises multiple sets of resource groups, and the resource group comprises two resource elements (RE) that are consecutive in a frequency domain; and
control a communication interface to receive the reference signal via time-frequency resource for the reference signal;
wherein the processor is further configured to demodulate the control channel according to the reference signal;
wherein for a plurality of terminal devices comprising the terminal device, the time-frequency resource for the reference signal is mapped, along with a configured control channel resource unit where the time-frequency resource for the reference signal is located, in a first control region within a system bandwidth in a manner of first a frequency domain and then a time domain;
wherein when different terminal devices comprising the terminal device receive the reference signal transmitted by adjacent beams, for the adjacent beams, there is a shift between locations of the time-frequency resource for the reference signal.

15. The terminal device according to claim 14, wherein the processor is further configured to control the communication interface to receive reference signal configuration information transmitted by a network device, wherein the reference signal configuration information comprises time-frequency resource location information of the reference signal;
the processor is configured to determine the time-frequency resource for the reference signal according to the reference signal configuration information.

* * * * *